(12) United States Patent
Peyron et al.

(10) Patent No.: US 11,883,874 B2
(45) Date of Patent: Jan. 30, 2024

(54) METHOD FOR MANUFACTURING A STRUCTURAL SURFACE HEAT EXCHANGER FOR A NACELLE

(71) Applicant: Safran Nacelles, Gonfreville l'Orcher (FR)

(72) Inventors: Vincent Peyron, Moissy Cramayel (FR); Jean-Nicolas Bouchout, Moissy Cramayel (FR); Flavie Hubert-Choinard, Moissy Cramayel (FR); Alexandra Dugardin, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 17/492,790

(22) Filed: Oct. 4, 2021

(65) Prior Publication Data

US 2022/0023931 A1    Jan. 27, 2022

Related U.S. Application Data

(63) Continuation of application No. PCT/EP2020/058630, filed on Mar. 26, 2020.

(30) Foreign Application Priority Data

Apr. 3, 2019   (FR) ..................................... 19/03546

(51) Int. Cl.
*B21D 53/04* (2006.01)

(52) U.S. Cl.
CPC ........... *B21D 53/04* (2013.01); *Y10T 29/4935* (2015.01)

(58) Field of Classification Search
CPC ........................... B21D 53/04; Y10T 29/4935
See application file for complete search history.

(56) References Cited

U.S. PATENT DOCUMENTS

| | | | | |
|---|---|---|---|---|
| 3,757,856 A | * | 9/1973 | Kun ....................... | B21D 53/08 29/890.039 |
| 5,369,883 A | * | 12/1994 | So .......................... | F28F 13/12 29/890.039 |

(Continued)

FOREIGN PATENT DOCUMENTS

| | | |
|---|---|---|
| DE | 4140729 | 6/1993 |
| JP | 2000141066 | 5/2000 |

(Continued)

OTHER PUBLICATIONS

English Machine Translation of JP 2000141066-A, Hori et al. (Year: 2000).*

(Continued)

*Primary Examiner* — Sarang Afzali
(74) *Attorney, Agent, or Firm* — Burris Law, PLLC

(57) ABSTRACT

A method for manufacturing a structural surface heat exchanger of preset or left-hand final shape for an aircraft includes the steps of forming, shaping and assembling, by welding or brazing, a first corrugated skin and a second smooth skin in order to obtain channels. Each channel is delimited by a corrugation of the first skin and the second smooth skin so as to form a structural surface heat exchanger of preset or left-hand final shape, wherein a fluid is configured to circulate in the channels and air is configured to circulate in contact with the second smooth skin.

7 Claims, 7 Drawing Sheets

(56) References Cited

U.S. PATENT DOCUMENTS

| | | | | |
|---|---|---|---|---|
| 8,292,227 B2* | 10/2012 | Stuhr | ............ | B64F 5/10 |
| | | | | 428/182 |
| 10,781,318 B2* | 9/2020 | Folsom | ............ | C09D 163/00 |
| 2010/0006700 A1 | 1/2010 | Stuhr et al. | | |
| 2012/0132407 A1* | 5/2012 | Makhlouf | ............ | F28D 9/0025 |
| | | | | 165/173 |
| 2016/0348987 A1 | 12/2016 | Minami et al. | | |

FOREIGN PATENT DOCUMENTS

| | | | | |
|---|---|---|---|---|
| WO | WO-2007071253 A2 * | 6/2007 | ............ | B21D 53/04 |
| WO | 2012095688 | 7/2012 | | |

OTHER PUBLICATIONS

International Search Report for International Application PCT/EP2020/058630, dated Aug. 7, 2020.

Liu et al., The Effect of Interface Defect on Mechanical Properties and its Formation Mechanism in Friction Stir Lap Welded Joints of Aluminum Alloys, Journal of Materials Processing Technology, Jun. 20, 2016, pp. 244-254, vol. 238, Elsevier, NL.

Ramachandran, et al., Performance Analysis of Dissimilar Friction Stir Welded Aluminium Alloy AA5052 and HSLA Steel Butt Joints Using Response Surface Method, Jan. 27, 2016, pp. 2373-2392, vol. 86(9), Springer, London.

* cited by examiner

METHOD FOR MANUFACTURING A STRUCTURAL SURFACE HEAT EXCHANGER FOR A NACELLE

CROSS-REFERENCE TO RELATED APPLICATIONS

This application is a continuation of International Application No. PCT/EP 2020/058630, filed on Mar. 26, 2020, which claims priority to and the benefit of FR 19/03546 filed on Apr. 3, 2019. The disclosures of the above applications are incorporated herein by reference.

FIELD

The present disclosure relates to a method for manufacturing a structural surface heat exchanger for a nacelle.

BACKGROUND

The statements in this section merely provide background information related to the present disclosure and may not constitute prior art.

As used herein, "adjusted" or "left shape" refers to a non-planar shape.

More particularly, a left shape is a non-developable shape.

An aircraft is propelled by one or more propulsion units, each typically including an engine housed in a tubular nacelle. Each propulsion unit is attached to the aircraft by a mast generally located under or on a wing of the aircraft or at the level of the fuselage of the aircraft.

An engine is also typically referred to as a turbojet engine and the terms engine and turbojet engine are used interchangeably herein.

A nacelle generally has a tubular structure having an upstream section, including an air inlet upstream of the turbojet engine, a middle section, configured to surround a fan of the turbojet engine, a downstream section, configured to accommodate a thrust reversal device and configured to surround the combustion chamber of the turbojet engine, and the tubular structure is generally terminated by an ejection nozzle which defines an outlet that is located downstream of the turbojet engine.

Furthermore, a nacelle typically includes an outer structure including a fixed portion and a movable portion (e.g., a thrust reversal device), and an Inner Fixed Structure ("IFS"), concentric with the outer structure, at the level of the downstream section. The IFS surrounds the core of the turbojet engine behind the fan. These outer and inner structures define an annular flow path, also referred to as a secondary flow path, configured to channel a flow of cold air, also referred to as secondary air, which circulates outside the turbojet engine.

The outer structure includes an outer fairing defining an outer aerodynamic surface, and an inner fairing defining an inner aerodynamic surface. The inner and outer fairings are connected upstream by a leading edge wall forming the air intake lip.

The tubular structure of a nacelle includes portions having adjusted surfaces, such as the surfaces surrounding the secondary flow path, and portions having left surfaces, such as the outer fairing of the outer structure of the nacelle, except possibly the trailing edge.

In general, the turbojet engine includes a set of blades (e.g., compressor blades, fan blades, and/or non-ducted propeller blades) driven in rotation by a gas generator through a set of transmission components.

A lubricant distribution system is provided to lubricate and cool these transmission components. The lubricant is typically oil. Thus, the terms lubricant and oil are used interchangeably herein.

A cooling system including at least one heat exchanger is configured to cool the lubricant.

Some lubricant cooling systems include a first surface heat exchanger configured to exchange heat between a heat transfer fluid and the lubricant, and a second surface heat exchanger configured to exchange heat between the heat transfer fluid and air. Such a cooling system typically includes a closed circuit heat transfer fluid circulation conduit. More particularly, the heat transfer fluid circulation conduit includes a portion disposed in the nacelle in contact with the inner and/or outer fairing of the nacelle. Even more particularly, the portion disposed in the nacelle in contact with the inner and/or outer fairing of the nacelle includes a plurality of channels arranged in parallel, the channels being formed by a double wall of the inner and/or outer fairing, this being known as a structural surface heat exchanger.

A structural surface heat exchanger participates in the mechanical functions of the nacelle. Furthermore, it contributes to the passage of forces, including during heat exchange.

The channels formed by a double wall of the inner and/or outer fairing are typically manufactured by assembling a skin having corrugations on an aerodynamic (e.g., smooth) skin using rivets. The skin then forms the double wall of the inner and/or outer fairing.

Such a typical method has the drawbacks of reducing the aerodynamic performance of the inner and/or outer fairing because of the presence of rivets.

The teachings of the present disclosure address these and other issues with traditional methods for manufacturing structural surface heat exchangers for nacelles.

SUMMARY

This section provides a general summary of the disclosure and is not a comprehensive disclosure of its full scope or all of its features.

The teachings of the present disclosure provide a method for manufacturing a structural surface heat exchanger having an adjusted or left final shape particularly suited to the manufacture of nacelles, having little or no impact on the aerodynamic performance of the nacelles, and whose mass is reduced.

To this end, the method according to the present disclosure is a method for manufacturing a structural surface heat exchanger of an adjusted or left final shape for an aircraft, including the steps of forming, shaping and assembling by welding or brazing a first corrugated skin and of a second smooth skin in order to obtain channels. Each channel is delimited by a corrugation of the first skin and the second smooth skin, so as to form the structural surface heat exchanger of an adjusted or left final shape, in which a fluid is configured to circulate in the channels, and air is configured to circulate in contact with the second smooth skin.

The second smooth skin is configured to be in contact with an air flow and is configured to maximize the flow of the air flow. The second smooth skin is also referred to as aerodynamic skin. In this way, the heat exchanger does not increase aerodynamic loss the way a finned heat exchanger can.

The method of the present disclosure can include one or more of the following optional features, considered alone or according to all the possible combinations.

According to one form, the method includes a step of forming cavities in the first or the second skin, in order to obtain fluid distributors and collectors during the assembly of the first and second skins. In one form, the forming step may optionally be carried out in a press.

In an alternative form, the step of forming cavities in the first or the second skin is carried out by machining the mass of the first or second skin.

A fluid distributor is a cavity permitting the distribution of the fluid at the inlet of the channels.

A fluid collector is a cavity permitting the collection of the fluid at the outlet of the channels.

According to another form, the step of assembling the first and second skins is carried out by brazing. In one optional form, the brazing is performed according to the following parameters: application of a metal strip having a melting temperature in the range of 450° C. to 600° C. on the contact areas between the two skins; application of a contact pressure between the two skins in the range of 50 g/cm$^2$ to 350 g/cm$^2$; and application of a heat treatment in the range of 2 hours to 20 hours at a temperature in the range of 120° C. to 220° C., so as to obtain a state T6.

As used herein, "state T6" refers to a state of aging suitable for obtaining the optimum mechanical strengths of the assembly, in particular in the case where the first and second skins are made of aluminum.

The metal strip is also referred to as filler metal or solder. In one form, the metal strip may optionally be an alloy or a clad sheet.

According to yet another form, the step of assembling the first and second skins is carried out by laser welding. In one optional form, the laser welding is performed according to the following parameters: laser power in the range of 2000 W to 4000 W; laser advance speed in the range of 2 m/min to 5 m/min; focal distance between the laser and the first or second skin in the range of 300 mm to 500 mm; inclination of the laser in the range of 3° to 7° with respect to the first and second skins; and direction of welding by pushing the material.

As used herein, "direction of welding by pushing the material" refers to the laser being pushed during its displacement, as opposed to a welding direction by pulling the material for which the laser would be drawn during its displacement.

According to still another form, the laser welding is carried out under gas protection, e.g., under argon and/or helium protection.

According to a further form, the laser welding is carried out with a filler metal.

In one alternative form, the laser welding is carried out without filler metal, by melting the material constituting the first and second skins.

According to still a further form, the step of assembling the first and second skins is carried out by friction stir welding. In one optional form, the friction stir welding is performed according to the following parameters: use of a substantially cylindrical tool including a retractable pin with a diameter in the range of 2 mm to 5 mm and a length in the range of 1 mm to 5 mm so that the retractable pin penetrates into the first skin and into half of the thickness of the second skin; application of a contact pressure between the two skins in the range of 1 kN to 5 kN, via a pressure device such as the substantially cylindrical tool; clamping of the two skins via a movable clamping device; tool rotation speed in the range of 500 rpm to 1500 rpm; inclination of the tool in the range of 1° to 5° with respect to a plane normal to the first and second skins; and tool advance speed in the range of 100 mm/min to 700 mm/min.

According to one form, the method includes the following steps: a) forming a first skin to obtain a first corrugated skin; b) shaping the first corrugated skin obtained in step (a) to obtain a first corrugated skin of an adjusted or left final shape; c) shaping a second smooth skin to obtain a second smooth skin with an adjusted or left final shape; d) assembling the first and second skins of an adjusted or left final shape obtained in steps (b) and (c) to obtain channels, each channel being delimited by a corrugation of the first skin and the second smooth skin, so as to form the structural surface heat exchanger of an adjusted or left final shape, in which a fluid is configured to circulate in the channels, and air is configured to circulate in contact with the second smooth skin.

In this form, steps (a) and (b) of forming and shaping the first skin make it possible to shape the first skin in order to produce corrugations and an adjusted or left shape, while step (c) of shaping the second skin makes it possible to shape the second skin to get an adjusted or left shape.

This method advantageously permits the manufacture of structural surface heat exchangers with an adjusted or left final shape of a small dimension, e.g., having a radius of curvature of less than 1 m.

According to one form, the shaping step (c) is carried out by tensioning.

According to another form, the shaping step (b) is carried out by tensioning.

Thus, the shaping steps (b) and/or (c) can be carried out by tensioning.

According to yet another form, the steps (a) and (b) of forming and shaping the first skin, are carried out simultaneously, for example in a press.

According to still another form, the steps (a) and (b) of forming and shaping the first skin are carried out successively, the forming step (a) being carried out, for example, in a press and the shaping step (b) being carried out, for example, by tensioning.

According to a further form, the step of assembling the first and second skins is carried out by brazing. In one optional form, the brazing is performed according to the following parameters: application of a metal strip having a melting temperature in the range of 450° C. to 600° C. on the contact areas between the two skins; application of a contact pressure between the two skins in the range of 50 g/cm$^2$ to 350 g/cm$^2$; and application of a heat treatment in the range of 2 hours to 20 hours at a temperature in the range of 120° C. to 220° C., so as to obtain a state T6.

The metal strip is also referred to as filler metal or solder. In one optional form, the metal strip is an alloy or a clad sheet.

According to still another form, the step of assembling the first and second skins is carried out by laser welding. In one optional form, the laser welding is performed according to the following parameters: laser power in the range of 2000 W to 4000 W; laser advance speed in the range of 2 m/min to 5 m/min; focal distance between the laser and the first or second skin in the range of 300 mm to 500 mm; inclination of the laser in the range of 3° to 7° with respect to the first and second skins.

According to one form, the laser welding is carried out under gas protection, e.g., under argon and/or helium protection.

According to another form, the laser welding is carried out with a filler metal.

In an alternative form, the laser welding is carried out without filler metal, by melting the material constituting the first and second skins.

According to yet another form, the step of assembling the first and second skins is carried out by friction stir welding. In one optional form, the friction stir welding is performed according to the following parameters: use of a substantially cylindrical tool including a retractable pin with a diameter in the range of 2 mm to 5 mm and a length in the range of 1 mm to 5 mm so that the retractable pin penetrates into the first skin and into half of the thickness of the second skin; application of a contact pressure between the two skins in the range of 1 kN to 5 kN, via a pressure device such as the substantially cylindrical tool; clamping of the two skins thanks to a movable clamping device; tool rotation speed in the range of 500 rpm to 1500 rpm; inclination of the tool in the range of 1° to 5° with respect to a plane normal to the first and second skins; and tool advance speed in the range of 100 mm/min to 700 mm/min.

According to one form, the method includes a step of forming the second skin prior to step (c) of shaping the second skin, to obtain a second skin including cavities configured to form fluid distributors and collectors during the assembly of the first and second skins of step (d), for example in a press or by machining the mass of the second skin.

According to another form, the step of forming the first skin of step (a) includes a step of forming cavities configured to form fluid distributors and collectors when assembling the first and second skins of step (d), for example in a press or by machining the mass of the first skin.

According to yet another form, the method includes a step of assembling fluid distributors and collectors on the first corrugated skin obtained in step (a), by welding. In one optional form, the welding is TIG welding.

According to still another form, the method includes a step of controlling the assembly and/or shaping steps.

According to a further form, the first skin and/or the second skin is made of aluminum or an alloy including aluminum. In one optional form, the first skin and/or the second skin is of the 6000 series. This can improve the lightness and the formability of the skin.

According to still another form, the first skin has a thickness in the range of 1 mm to 3 mm and the second skin has a thickness in the range of 0.6 mm to 2 mm.

According to a another form, the method according to the present disclosure is a method for manufacturing a structural surface heat exchanger of an adjusted or left final shape for an aircraft, including the following steps of: forming a first skin to obtain a first corrugated skin, for example in a press; assembling the first corrugated skin obtained in step (a) on a second smooth skin to obtain channels, each channel being delimited by a corrugation of the first skin and the second smooth skin, so as to form a structural surface heat exchanger of a right intermediate shape; shaping the structural surface heat exchanger of a right intermediate shape obtained in step (b) to obtain a structural surface heat exchanger of an adjusted or left final shape between a fluid configured to circulate in the channels, and air configured to circulate in contact of the second smooth skin.

The second smooth skin is configured to be in contact with an air flow and is configured to maximize the flow of the air flow. The second smooth skin is also referred to as aerodynamic skin. As used herein, "smooth" means without external protuberances that reduce aerodynamic flow of air over the skin, such as rivets for example.

As used herein, "right intermediate shape" refers to a substantially planar shape, as opposed to an adjusted or left shape.

In this form, step (a) of forming the first skin makes it possible to shape the first skin in order to produce corrugations, while step (c) of shaping the structural surface heat exchanger of a right intermediate shape obtained in step (b) allows shaping the heat exchanger to obtain an adjusted or left shape.

This method advantageously permits the manufacture of structural surface heat exchangers with an adjusted or left final shape of large dimension, e.g., having a radius of curvature greater than 1 m.

According to one form, the shaping step (c) is carried out by tensioning.

According to another form, the method includes a step of forming the second skin prior to step (b) of assembling the first and second skin, to obtain a second skin including cavities configured to form fluid distributors and collectors when assembling the first and second skins of step (b). In one optional form, the forming step is performed in a press or by machining the mass of the second skin.

According to still another form, the method includes a step of forming cavities in the first skin, to obtain fluid distributors and collectors when assembling the first and second skins. In one optional form, the forming step is performed in a press or by machining the mass of the first skin.

According to yet another form, the method includes a step of assembling fluid distributors and collectors on the first corrugated skin obtained in step (a), by welding, prior to step (b) of assembling the first and second skins. In one optional form, the welding is TIG welding.

According to another form, the step of forming the first skin of step (a) includes a step of forming cavities, to obtain fluid distributors and collectors when assembling the first and second skins, the forming step being produced, for example, in a press or by machining the mass of the first skin.

According to still another form, the step of assembling the first and second skins is carried out by brazing, according to the following parameters: application of a metal strip having a melting temperature in the range of 450° C. to 600° C. on the contact areas between the two skins; application of a contact pressure between the two skins in the range of 50 g/cm$^2$ to 350 g/cm$^2$; and application of a heat treatment in the range of 2 hours to 20 hours at a temperature in the range of 120° C. to 220° C., so as to obtain a state T6.

The metal strip is also referred to as filler metal or solder. In one optional form, the metal strip is an alloy or a clad sheet.

According to one form, the step of assembling the first and second skins is carried out by laser welding. In one optional form, the laser welding is performed according to the following parameters: laser power in the range of 2000 W to 4000 W; laser advance speed in the range of 2 m/min to 5 m/min; focal distance between the laser and the first or second skin in the range of 300 mm to 500 mm; inclination of the laser in the range of 3° to 7° with respect to the first and second skins; and direction of welding by pushing the material.

According to one form, the laser welding is carried out under gas protection, e.g., under argon and/or helium protection.

According to another form, the laser welding is carried out with a filler metal.

In one alternative form, the laser welding is carried out without filler metal, by melting the material constituting the first and second skins.

According to a further form, the step of assembling the first and second skins is carried out by friction stir welding. In one optional form, the friction stir welding is performed according to the following parameters: use of a substantially cylindrical tool including a retractable pin with a diameter in the range of 2 mm to 5 mm and a length in the range of 1 mm to 5 mm so that the retractable pin penetrates into the first skin and into half of the thickness of the second skin; application of a contact pressure between the two skins in the range of 1 kN to 5 kN, via a pressure device, e.g., the substantially cylindrical tool; clamping of the two skins via a movable clamping device; tool rotation speed in the range of 500 rpm to 1500 rpm; inclination of the tool in the range of 1° to 5° with respect to a plane normal to the first and second skins; and tool advance speed in the range of 100 mm/min to 700 mm/min.

According to one form, the method includes a step of controlling the assembly and/or shaping steps.

According to another form, the first skin and/or the second skin is made of aluminum or an alloy including aluminum. In one optional form, the first skin and/or the second skin is of the 6000 series. This improves the lightness and the formability of the skin.

According to a further form, the first skin has a thickness in the range of 1 mm to 3 mm and the second skin has a thickness in the range of 0.6 mm to 2 mm.

The teachings of the present disclosure further include a heat exchanger obtained by the methods as described above.

Such a heat exchanger is a structural surface heat exchanger for an aircraft and has an adjusted or left final shape.

According to one form, the heat exchanger includes a first corrugated skin of an adjusted final shape assembled on a second smooth skin of an adjusted final shape.

According to another form, the heat exchanger includes a first corrugated skin of a left final shape assembled on a second smooth skin of a left final shape.

Thus, the heat exchanger includes a first corrugated skin of an adjusted or left final shape assembled on a second smooth skin of an adjusted or left final shape.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
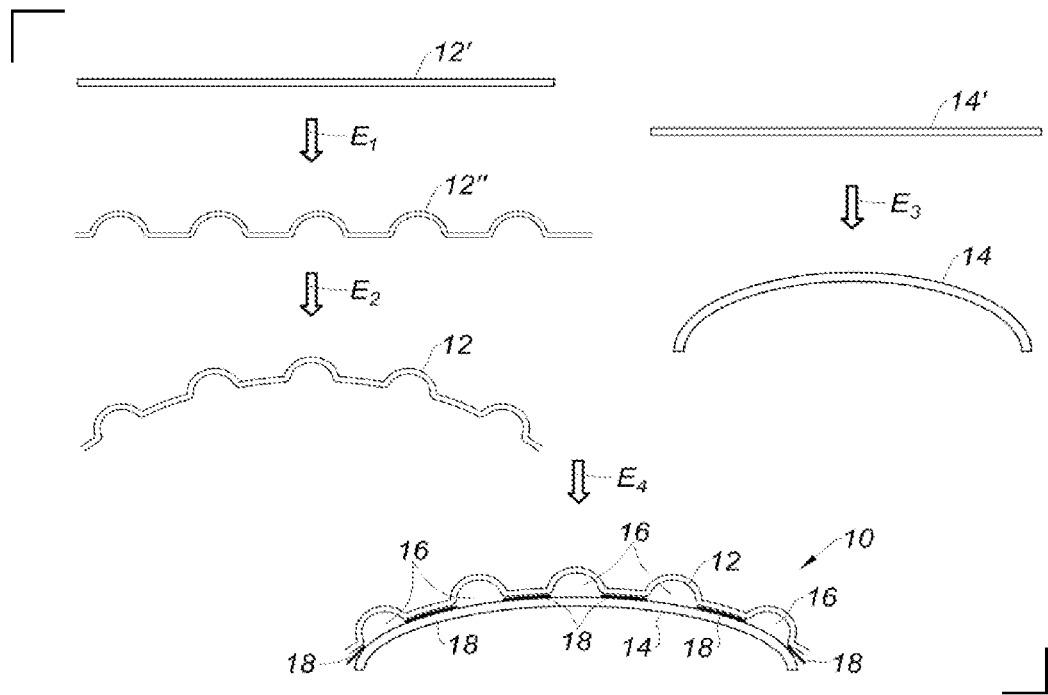
FIG. 1 is a schematic side view illustrating a method for manufacturing a structural surface heat exchanger of an adjusted final shape, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description which follows and in the claims, identical, similar or analogous components will be designated by the same reference numerals.

FIG. 1 represents a method for manufacturing a structural surface heat exchanger with an adjusted final shape 10, according to a first form of the present disclosure.

The heat exchanger 10 includes a first corrugated skin of an adjusted final shape 12 assembled on a second smooth skin of an adjusted final shape 14 (the "first corrugated skin of an adjusted final shape 12" is also referred to herein as the "first corrugated skin 12" or the "first skin 12" and the "second smooth skin of an adjusted final shape 14" is also referred to herein as the "second smooth skin 14" or the "second skin 14"). When assembled, the first corrugated skin 12 and second smooth skin 14 form channels 16. Each channel 16 is delimited by a corrugation of the first corrugated skin of an adjusted final shape 12 and the second smooth skin of an adjusted final shape 14. Thus, each channel 16 has a section of semi-circle.

The heat exchanger 10 is a heat exchanger configured to exchange heat between a fluid F1 (FIG. 12) and air F2 (FIG. 12), the fluid F1 being configured to circulate in the channels 16 and the air F2 being configured to circulate in contact with the second smooth skin 14.

The method includes a step E1 of forming a first substantially planar skin 12' into a first corrugated skin 12" whose corrugations are in the shape of semi-circles. This step E1 is followed by a step E2 of shaping the first corrugated skin 12" to obtain the first corrugated skin of an adjusted final shape 12. In parallel with steps E1 and E2, a step E3 is performed which includes shaping a second substantially planar smooth skin 14' to obtain the second smooth skin of an adjusted final shape 14.

The first corrugated skin of an adjusted final shape 12 and the second smooth skin of an adjusted final shape 14 are then assembled during an assembly step E4 to obtain the structural surface heat exchanger of an adjusted final shape 10.

The first substantially planar skin 12' is preferably in an initial state O, which allows it to be malleable and to be able to undergo the forming step E1. As used herein, an "initial state O" refers to an annealed state to obtain the state with the lowest mechanical resistance and to increase the ductility of the material constituting the first substantially planar skin 12' and the second substantially planar smooth skin 14', such as aluminum for example.

During the forming step E1, the first substantially planar skin 12' undergoes several heat treatments between several intermediate forming steps, in order to find, before each intermediate forming step, a ductile state of the material suitable for generating the elongation of the next forming step.

The first substantially planar skin 12' is then preferably quenched in order to make it more resistant. It is then referred to as state T4.

Figure 3:
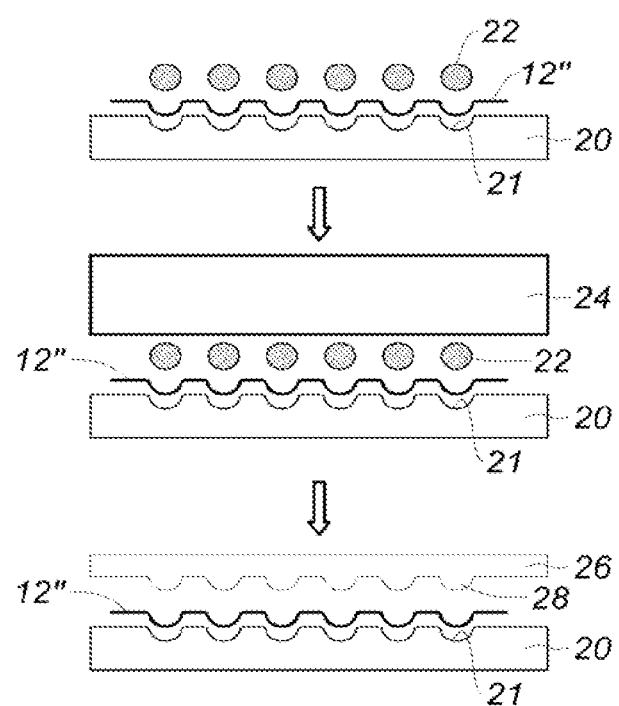
FIG. 3 is a schematic side view illustrating steps for forming a first corrugated skin in a press, as part of a method for manufacturing a structural surface heat exchanger of an adjusted final shape in accordance with the teachings of the present disclosure.

The step E1 of forming the first substantially planar skin 12' is carried out in a press, as illustrated in FIG. 3. Performing step E1 using a press can reduce costs compared to other methods of forming.

Figure 6:
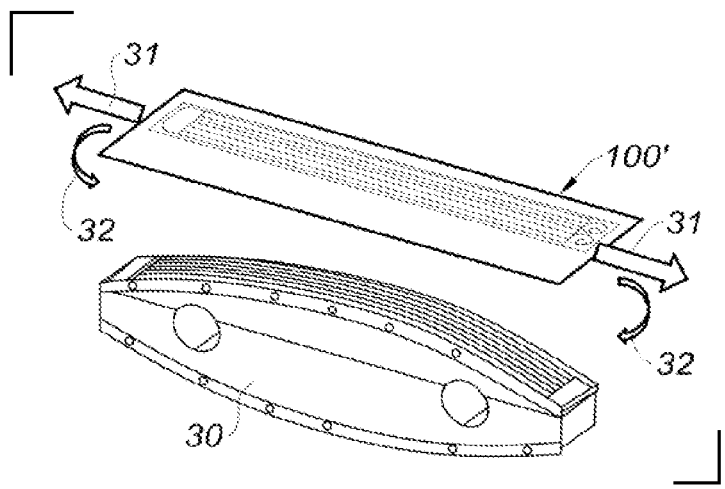
FIG. 6 is a schematic perspective view illustrating steps for shaping by tensioning, applied to a structural heat exchanger of a right intermediate shape, as part of a method for manufacturing a structural surface heat exchanger of an adjusted final shape in accordance with the teachings of the present disclosure.

The shaping steps E2 and E3 are carried out by tensioning, as illustrated in FIG. 6.

During the step E2 of shaping the first corrugated skin 12", the first corrugated skin 12" can be in the state T4.

During the step E3 of shaping the second substantially planar skin 14', the second substantially planar skin 14' can be in the state T4.

The step E4 of assembling the first corrugated skin of an adjusted final shape 12 and the second smooth skin of an adjusted final shape 14 is carried out by brazing. To this end, a metal strip 18 is applied to the contact areas between the first corrugated skin of an adjusted shape 12 and the second smooth skin of an adjusted shape 14. The metal strip 18 has a melting temperature equal to or approximately 500° C. During brazing, a pressure device (not represented) applies pressure to the contact areas between the first skin 12 and the second skin 14. The pressure applied is equal to or approximately 200 g/cm². The assembly via brazing is then carried out by applying heat treatment cycles including a heat treatment adapted to obtain a final state T6.

Figure 2:
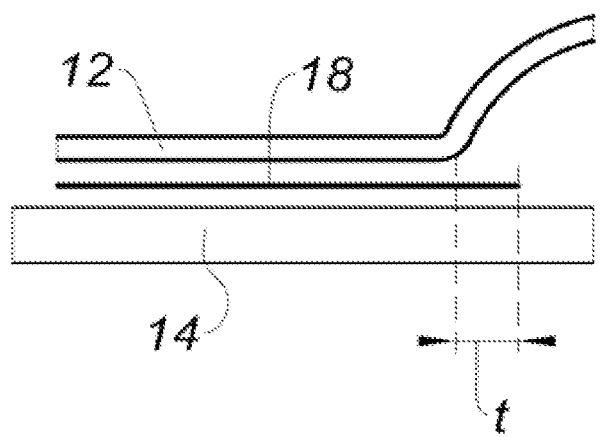
FIG. 2 is a side view of a portion of the heat exchanger of FIG. 1.

More particularly, as illustrated in FIG. 2, the metal strip 18 is placed on the contact faces between the first skin 12 and the second skin 14 with a tolerance "t" equal to or approximately 2 mm.

In order to facilitate assembly by brazing, pins (not represented) are arranged at the ends of the first skin 12 and the second skin 14 in order to index them with respect to one another, that is to say to position them relative to each other.

Figure 7A:
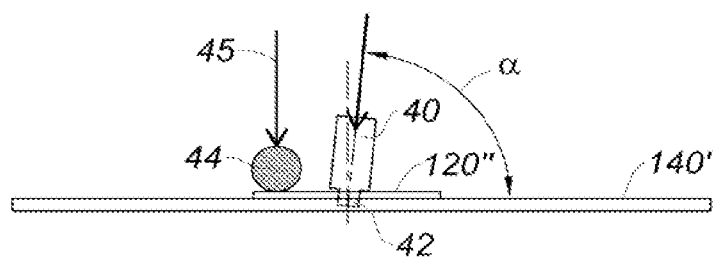
FIG. 7A is a schematic side view illustrating an assembly step by friction stir welding, as part of a method for manufacturing a structural surface heat exchanger of an adjusted final shape in accordance with the teachings of the present disclosure.
Figure 7B:
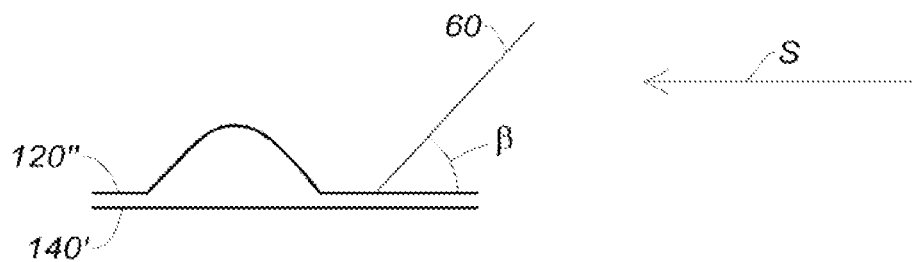
FIG. 7B is a schematic side view illustrating an assembly step by laser welding, as part of a method for manufacturing a structural surface heat exchanger of an adjusted final shape in accordance with the teachings of the present disclosure.

In an alternative form, the assembly step E4 can be carried out by welding, such as by friction stir welding illustrated in FIG. 7A, or by laser welding illustrated in FIG. 7B. According to these alternative forms, the heat exchanger obtained is a structural surface heat exchanger identical to the structural surface heat exchanger 100 obtained according to the method of FIG. 5.

In another form, not specifically shown, the step E2 of shaping the first skin 12' results in a first corrugated skin of a left final shape (not represented), and the step E3 of shaping the second smooth skin 14' results in a second smooth skin of a left final shape (not represented). According to this form, the step E4 of assembling the first skin 12 and the second skin 14 results in a structural surface heat exchanger of left final shape (not represented).

In another form, not specifically shown, the step E1 of forming the first skin 12 results in a first corrugated skin 12" with corrugations that are square or triangular in shape. The heat exchanger obtained according to this form has channels of square or triangular section.

FIG. 3 illustrates the step E1 of forming the first skin 12' (FIG. 1) in a press. For this purpose, the first substantially planar skin 12' (FIG. 1) is placed on a female mold 20 having indentations 21 of section identical to the section of the channels 16 (FIG. 1) of the heat exchanger 10 (FIG. 1) to be manufactured. Then, rubber elements 22, of section identical to the section of the channels 16 (FIG. 1) of the heat exchanger 10 (FIG. 1) to be manufactured, are applied to the first skin 12' (FIG. 1), so as to form the corrugations of the first corrugated skin 12". Then, a rubber plate 24 is applied to the rubber elements 22. Finally, a male mold 26, having protuberances 28, of section identical to the section of the channels 16 (FIG. 1) of the heat exchanger 10 (FIG. 1) to be manufactured, is applied to the first corrugated skin 12" in place of the rubber elements 22 and the rubber plate 24, so as to finalize the formation of the corrugations.

The female mold 20 and the male mold 26 are complementary.

Figure 4:
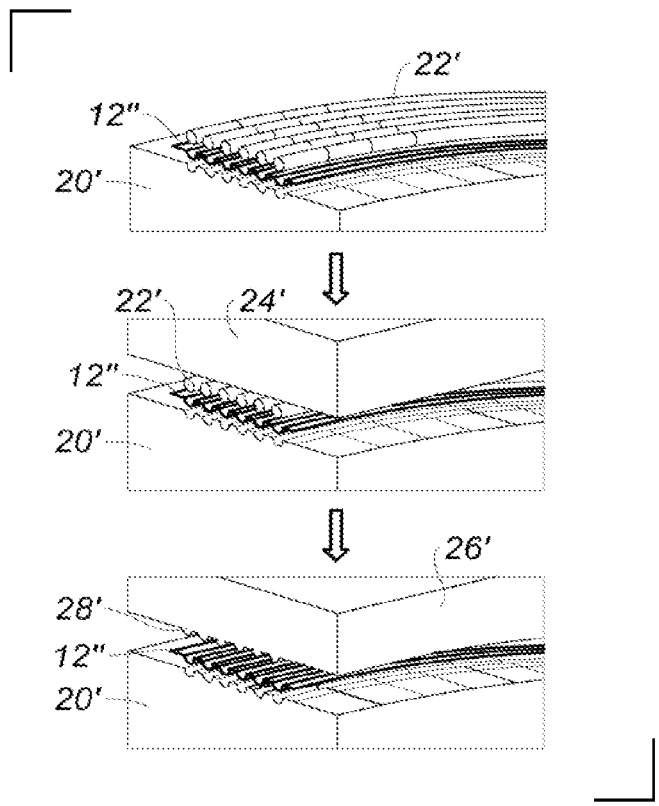
FIG. 4 is a schematic perspective view illustrating steps for forming and shaping a first corrugated skin in a press, as part of a method for manufacturing a structural surface heat exchanger of an adjusted final shape in accordance with the teachings of the present disclosure.

FIG. 4 illustrates another form of the method of FIG. 1, in which the steps E1 and E2, i.e., of forming and shaping the first skin, are carried out simultaneously in a press. For this purpose, the method is identical to the method described and illustrated with reference to FIG. 3, except the female mold 20', the rubber elements 22', the rubber plate 24' and the male mold 26' have an adjusted shape identical to the adjusted shape of the first corrugated skin 12" to be obtained.

In an alternative form, the female mold 20, the rubber elements 22, the rubber plate 24 and the male mold 26 can have a left shape identical to the left shape of the first corrugated skin of a left shape to be obtained.

Figure 5:
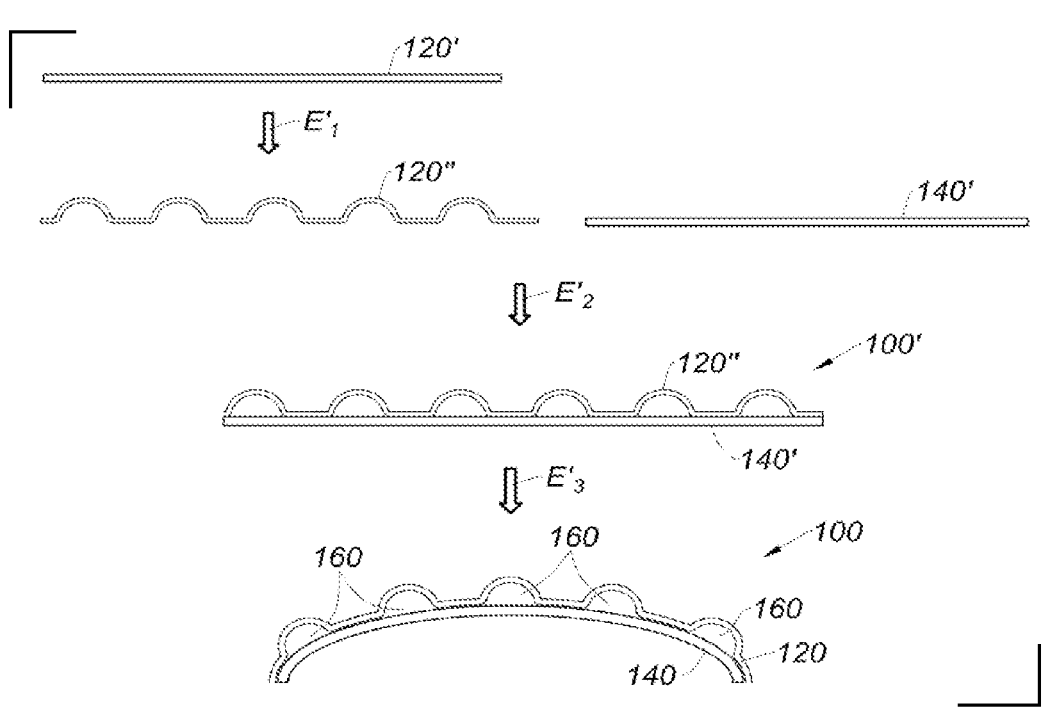
FIG. 5 is a schematic side view illustrating a method for manufacturing a structural surface heat exchanger of an adjusted final shape, according to a second form of the present disclosure.

FIG. 5 illustrates a method for manufacturing a structural surface heat exchanger with an adjusted final shape 100, according to another form of the present disclosure.

The heat exchanger 100 includes a first corrugated skin of an adjusted final shape 120 assembled on a second smooth skin of an adjusted final shape 140. The first 120 and second 140 skin assembled together form channels 160. Each channel 160 is delimited by a corrugation of the first corrugated skin of an adjusted final shape 120 and the second smooth skin of an adjusted final shape 140. Thus, each channel has a semi-circle section.

The heat exchanger 100 is a heat exchanger configured to exchange heat between a fluid F1 (FIG. 12) and air F2 (FIG. 12), the fluid F1 being configured to circulate in the channels 160 and the air F2 being configured to circulate in contact with the second smooth skin 140.

The method includes a step E'1 of forming a substantially planar first skin 120', resulting in a first corrugated skin 120". This step E'1 of forming the first skin 120' is followed by a step E'2 of assembling the first corrugated skin 120" on a second smooth skin 140', resulting in a structural surface heat exchanger of a right intermediate shape 100'. Then, a step E'3 of shaping the structural surface heat exchanger of a right intermediate shape 100' is carried out, resulting in the structural surface heat exchanger of an adjusted final shape 100.

In one form, the first substantially planar skin 120' is in an initial state O, which permits it to be malleable and to be able to undergo the forming step E1.

During the forming step E1, the first skin 120' undergoes several heat treatments, between several intermediate forming steps, in order to find, before each intermediate forming step, a ductile state of the material suitable for generating the elongation of the next forming step.

The first substantially planar skin 120' is then preferably quenched in order to make it more resistant. It is then referred to as state T4.

The step E1 of forming the first substantially planar skin 120' is carried out in a press, as illustrated in FIG. 3.

The step E'2 of assembling the first corrugated skin 120" and the second substantially planar skin 140" is carried out by friction stir welding, as illustrated in FIG. 7A.

In an alternative form, this step is carried out by laser welding or by brazing as illustrated in FIG. 2. In the form according to which the assembly step E'2 is carried out by brazing, a heat exchanger identical to the heat exchanger 10 is obtained by the method illustrated in FIG. 1.

The step E'3 of shaping the structural exchanger of a right intermediate shape 100' is carried out by tensioning, as illustrated in FIG. 6.

FIG. 6 illustrates the method for shaping by tensioning, applied to the structural heat exchanger of a right intermediate form 100' of FIG. 5.

The structural heat exchanger of a right intermediate shape 100' is applied to a tool 30 having an adjusted shape identical to the adjusted shape of the heat exchanger 100 to be obtained, and a tensioning force 31, 32 is applied to the ends of the heat exchanger 100' so as to shape the heat exchanger 100'.

In an alternative form, this method of FIG. 6 can be applied to the shaping steps E2 and E3 of FIG. 1.

FIG. 7A illustrates the friction stir welding step E'2 allowing the assembly of the first corrugated skin 120" and the second substantially planar skin 140' according to the method of FIG. 5. A substantially cylindrical tool 40 including a retractable pin 42 of a length equal to or approximately 3 mm is applied to the contact areas between the first corrugated skin 120" and the second smooth skin 140', and rotated at a speed equal to or approximately 1000 rpm so that the pin 42 passes through the first corrugated skin 120" and penetrates half the thickness of the second smooth skin 140'.

In parallel, a movable clamping roller 44 applies pressure 45 to the contact areas between the first corrugated skin 120" and the second smooth skin 140", equal to or approximately 3 kN.

The tool 40 is tilted and extends in a longitudinal direction having an angle α equal to or approximately 3° relative to the first corrugated skin 120".

The tool 40 traverses all of the contact areas between the first corrugated skin 120" and the second smooth skin 140" at an advance speed equal to or approximately 400 mm/min.

The tool 40 can travel a curvilinear path thanks to the roller upstream of the curvilinear path.

The roller is a pressure device and is controlled independently of the tool 40.

The tool 40 is a welding head placed on a robot or gantry.

This friction stir welding method softens the materials of the skins 120", 140" and mixes them thoroughly.

Alternatively, the pin 42 is not retractable.

FIG. 7B illustrates the laser welding step E'2 allowing the assembly of the first corrugated skin 120" and the second substantially planar skin 140' according to the method of FIG. 5. A laser 60 is applied at the level of the contact areas between the first corrugated skin 120" and the second smooth skin 140', inclined at an angle β equal to or approximately 5° with respect to the first corrugated skin 120" and the second substantially planar skin 140' and with a focal distance between the laser 60 and the first corrugated skin 120" equal to or approximately 400 mm (not visible in FIG. 7B). The laser 60 is displaced along the length of the first corrugated skin 120" in the direction of the arrow S. This welding direction is referred to as pushing the material because the laser 60 is pushed during its displacement. The laser 60 has a power equal to or approximately 3000 W. The laser 60 has an advance speed equal to or approximately 4 m/min.

Figure 7C:
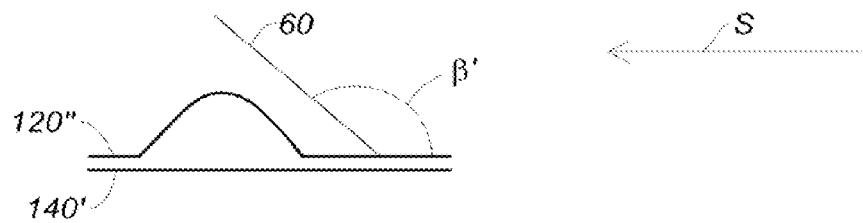
FIG. 7C is a schematic side view illustrating an alternative assembly step by laser welding, as part of a method for manufacturing a structural surface heat exchanger of an adjusted final shape in accordance with the teachings of the present disclosure.

FIG. 7C illustrates another form of the laser welding step E'2 allowing the assembly of the first corrugated skin 120" and the second substantially smooth skin 140' according to the method of FIG. 5. In this form, the laser 60 is inclined at an angle β' equal to or approximately 175° relative to the first corrugated skin 120" and the second substantially smooth skin 140'. The laser 60 is displaced along the length of the first corrugated skin 120" in the direction of the arrow S. This welding direction is referred to as pulling the material because the laser 60 is pulled during its displacement.

Figure 8:
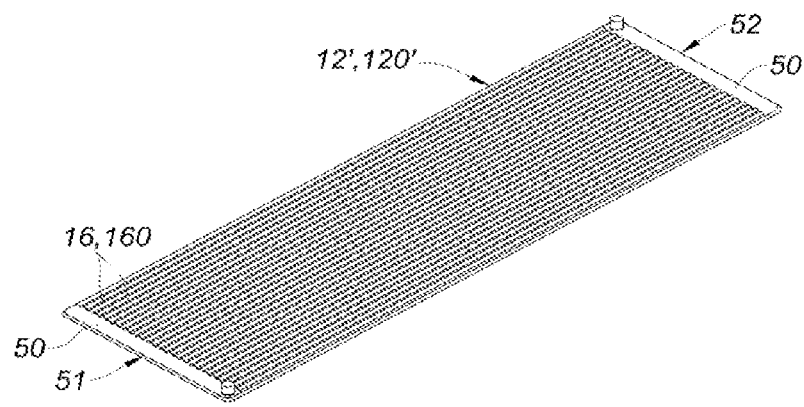
FIG. 8 is a perspective view illustrating a first corrugated skin including cavities at each of its ends configured to form fluid distributors and collectors, according to the teachings of the present disclosure.

FIG. 8 illustrates a first corrugated skin 12', 120' including cavities 50 at each of its ends 51, 52.

The cavities 50 are made during the forming step E1, E'1 of the first skin 12', 120'.

These cavities 50 are configured to form a fluid distributor and collector, respectively, during the step of assembling the first and second skins, making it possible to obtain a structural surface heat exchanger including a fluid distributor and collector.

Figure 9:
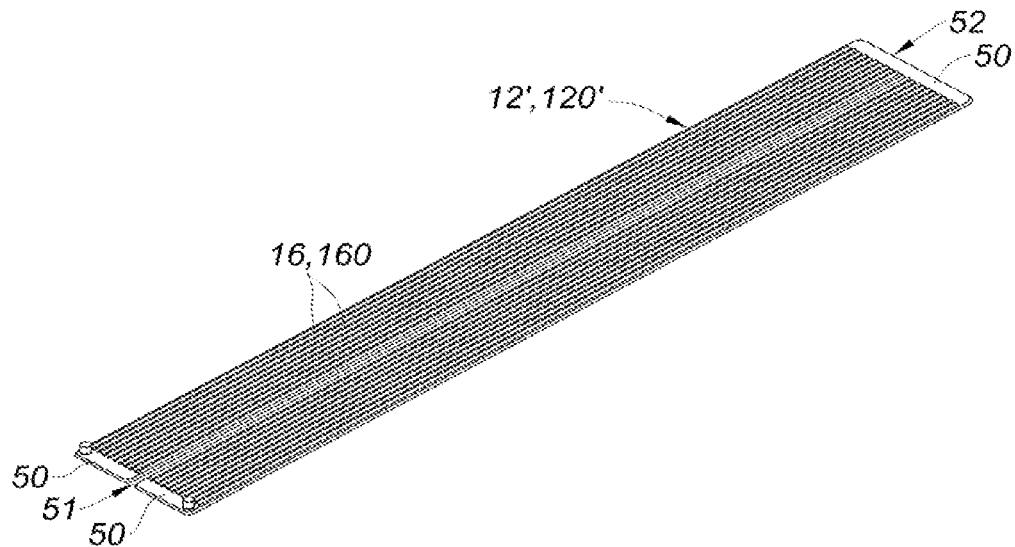
FIG. 9 is a perspective view illustrating a second construction of a first corrugated skin including cavities at each of its ends configured to form fluid distributors and collectors, according to the teachings of the present disclosure.

FIG. 9 illustrates another form of a first corrugated skin 12', 120' having cavities 50 at each of its ends.

In this form, the cavities are produced in the same way as described above with reference to FIG. 8. The first corrugated skin 12', 120' more precisely includes two cavities 50 at a first end 51 and a cavity 50 at the opposite end 52. The cavities 50 of the first end 51 are configured to form, respectively, a fluid distributor and collector, while the cavity 50 of the opposite end 52 is configured to form a half-turn collector permitting circulation of fluid between the channels 16, 160.

Figure 10:
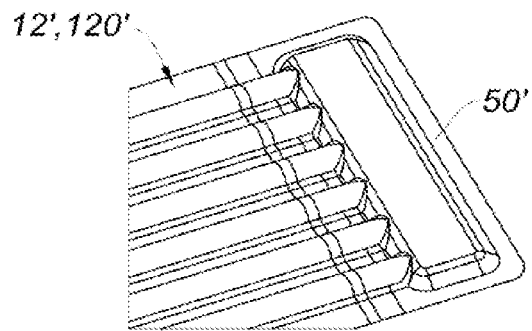
FIG. 10 is a perspective view illustrating a portion of one form of a first corrugated skin including a cavity at one of its ends, configured to form a fluid distributor or collector, according to the teachings of the present disclosure.

FIG. 10 illustrates a first corrugated skin 12', 120' having a cavity 50' at one end thereof.

The cavity 50' is assembled by welding on the first corrugated skin 12', 120', prior to the step of assembling the two skins or prior to the step of shaping the first corrugated skin 12', 120'.

In the same way as above, the cavity 50' is configured to form a fluid distributor or collector, during the assembly step with the second substantially smooth skin 14', 140'.

Figure 11:
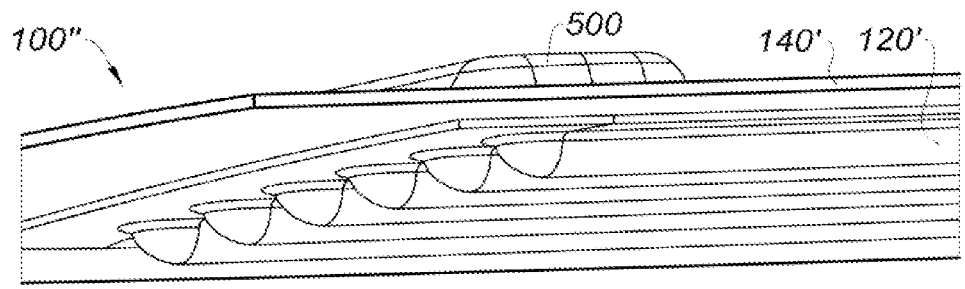
FIG. 11 is a perspective view illustrating a portion of a structural surface heat exchanger including a collector, according to the teachings of the present disclosure.

FIG. 11 illustrates a structural surface heat exchanger 100" including a first corrugated skin 120" assembled on a second substantially smooth skin 140', a fluid collector 500 being disposed on the second substantially smooth skin 140' at one of its ends.

According to this form, the method of FIG. 5 includes a step (not represented) of forming the second skin 140', prior to the assembly step E'2 of the skins 120", 140', to obtain a second substantially smooth skin 140' including a cavity configured to form the collector 500 during the assembly of the two skins 120", 140'. This forming step is carried out in a press, in the same way as illustrated and described above with reference to FIG. 3.

Figure 12:
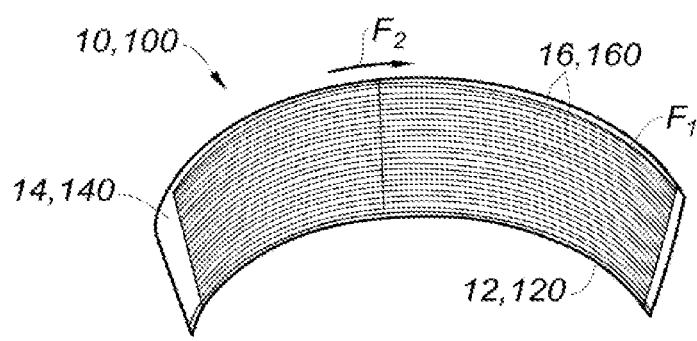
FIG. 12 is a perspective view of a heat exchanger according to the teachings of the present disclosure, obtained by the methods of the present disclosure.

FIG. 12 illustrates the structural surface heat exchanger of an adjusted final shape 10, 100 obtained by the methods of FIG. 1 or 5.

The heat exchanger 10, 100 includes a first corrugated skin of an adjusted shape 12, 120 and a second smooth skin of an adjusted shape 14, 140 which form channels 16, 160.

The heat exchanger 10, 100 is waterproof up to 10 bars.

In another form, not shown, the heat exchanger 10, 100 includes fluid distributors and collectors at one and/or the other of its ends, in order to allow distribution and collection the fluid F configured to circulate in the channels 16, 160. The collectors and distributors are formed according to the methods illustrated and described herein.

In another form, the heat exchanger 10, 100 includes at least one distributor as illustrated with reference to FIG. 13.

Figure 13:
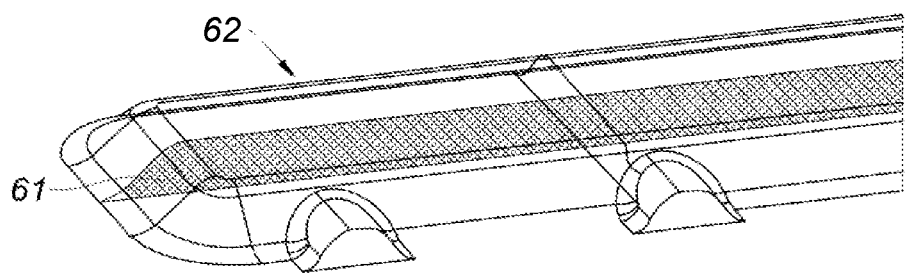
FIG. 13 is a perspective view of a portion of a distributor of a heat exchanger according to the teachings of the present disclosure, obtained by the methods of the present disclosure.

FIG. 13 illustrates an example of a distributor 62 including a distribution grid 61 making it possible to optimize the distribution of the fluid in the channels 16, 160 of the heat exchanger 10, 100 as illustrated above.

Moreover, in yet another form, not represented, a step of degreasing the first and second skins is carried out prior to the assembly step E4, E'3 of the first and second skins.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing a structural surface heat exchanger of an adjusted or left final shape for an aircraft, the method comprising:

forming a first skin to obtain a first corrugated skin;

shaping the first corrugated skin, shaping a second smooth skin, and assembling the first corrugated skin and the second smooth skin so that the first corrugated skin and the second smooth skin define channels, each channel being delimited by the second smooth skin and a corrugation of the first corrugated skin, wherein the step of assembling the first corrugated skin and the second smooth skin includes welding or brazing the first corrugated skin to the second smooth skin, wherein the steps of shaping the first corrugated skin, shaping the second smooth skin, and assembling the first corrugated skin and the second smooth skin form the structural surface heat exchanger of an adjusted or left final shape, configured to permit a fluid to circulate in the channels and air to circulate in contact with the second smooth skin; and forming cavities in the first skin simultaneously with the step of forming the first skin to obtain the first corrugated skin, or in the second smooth skin prior to the step of shaping the second smooth skin or assembling the first corrugated skin on the second smooth skin, to obtain fluid distributors and collectors when assembling the first corrugated skin and second smooth skin, wherein the step of forming cavities includes forming the cavities by operation of a press or by machining the first corrugated skin or the second smooth skin, wherein the first skin has a thickness of 1 mm to 3 mm and the second smooth skin has a thickness of 0.6 mm to 2 mm.

2. The method according to claim 1, wherein the step of assembling the first corrugated skin and the second smooth skin is carried out by friction stir welding according to a set of parameters comprising:
   use of a cylindrical tool including a retractable pin with a diameter of 2 mm to 5 mm and a length of 1 mm to 5 mm so that the retractable pin penetrates into the first corrugated skin and in half a total thickness of the second smooth skin;
   application of a contact pressure between the first corrugated skin and the second smooth skin of 1 kN to 5 kN, via a pressure device that includes the cylindrical tool;
   clamping the first corrugated skin and the second smooth skin via a movable clamping device;
   tool rotation speed of 500 rpm to 1500 rpm;
   inclination of the cylindrical tool of 1° to 5° with respect to a plane normal to the first corrugated skin and the second smooth skin; and
   tool advance speed of 100 mm/min to 700 mm/min.

3. The method according to claim 1, wherein the step of assembling the first corrugated skin and the second smooth skin is carried out by brazing, according to a set of parameters comprising:
   application of a metal strip having a melting temperature of 450° C. to 600° C. on contact areas between the first corrugated skin and the second smooth skin;
   application of a contact pressure between the first corrugated skin and the second smooth skin of 50 g/cm2 to 350 g/cm2; and
   application of a heat treatment of 2 hours to 20 hours at a temperature of 120° C. to 220° C., so as to obtain a state T6.

4. The method according to claim 1, wherein the step of assembling the first corrugated skin and the second smooth skin is carried out by laser welding, according to a set of parameters comprising:
   laser power of 2000 W to 4000 W;
   laser advance speed of 2 m/min to 5 m/min;
   focal distance between the laser and the first corrugated skin or second smooth skin of 300 mm to 500 mm;
   inclination of the laser of 3° to 7° with respect to the first corrugated skin and second smooth skin; and
   direction of welding by pushing.

5. The method according to claim 1 further comprising controlling the assembling, controlling the shaping, or both controlling the shaping and the assembling.

6. The method according to claim 1, wherein the first corrugated skin, the second smooth skin, or both the first corrugated skin and the second smooth skin is made of aluminum or an alloy including aluminum.

7. The method according to claim 6, wherein the first corrugated skin, the second smooth skin, or both the first corrugated skin and the second smooth skin are a 6000 series aluminum.

\* \* \* \* \*